(12) United States Patent
Mogensen et al.

(10) Patent No.: US 9,775,436 B2
(45) Date of Patent: Oct. 3, 2017

(54) SHELF (71) Applicant: LCC 2015 ApS, Odense N (DK)

(72) Inventors: Erling Kristen Mogensen, Middelfart (DK); Søren Bøgede Andersen, Odense N (DK); Steen Juul Thomsen, Morud (DK)

(73) Assignee: LCC 2015 ApS, Odense N (DK)

( * ) Notice: Subject to any disclaimer, the term of this patent is extended or adjusted under 35 U.S.C. 154(b) by 0 days.

(21) Appl. No.: 14/912,492

(22) PCT Filed: Aug. 20, 2014

(86) PCT No.: PCT/DK2014/050248
§ 371 (c)(1),
(2) Date: Feb. 17, 2016

(87) PCT Pub. No.: WO2015/024572
PCT Pub. Date: Feb. 26, 2015

(65) Prior Publication Data
US 2016/0192776 A1 Jul. 7, 2016

(30) Foreign Application Priority Data

Aug. 21, 2013 (DK) .................................. 2013 70456

(51) Int. Cl.
*A47B 13/00* (2006.01)
*A47B 96/02* (2006.01)
(Continued)

(52) U.S. Cl.
CPC .............. *A47B 96/02* (2013.01); *A47B 57/06* (2013.01); *A47B 57/20* (2013.01); *A47B 96/021* (2013.01);
(Continued)

(58) Field of Classification Search
CPC ....... A47B 47/04; A47B 47/024; A47B 57/30; A47B 57/34; A47B 57/40; A47B 57/48
(Continued)

(56) References Cited

U.S. PATENT DOCUMENTS

| 395,328 A | 1/1889 | Jewell |
| 407,882 A | 7/1889 | Wilder |

(Continued)

FOREIGN PATENT DOCUMENTS

| CN | 2439812 Y | 7/2001 |
| CN | 1977737 A | 6/2007 |

(Continued)

OTHER PUBLICATIONS

Danish Search Report issued in priority application No. PA 2013 70456, Apr. 4, 2014.
(Continued)

*Primary Examiner* — Jose V Chen
(74) *Attorney, Agent, or Firm* — Day Pitney LLP (57) ABSTRACT

A shelf (1) for mounting on a substantially rectangular load carrier having four identical columns arranged in the corners thereof. On the shelf a holder (3,3; 3", 3"') is mounted that can be inserted into complementary slots in the columns of the load carrier, said slots being configured with a carrier face by which the holder is capable of engaging in such a manner that the holder supports on the column. The holders are configured from an elastic material with a shock-absorbing part which is provided with a bend extending in the transverse direction of the shelf, said shock-absorbing part being anchored in the shelf to the effect that forces applied to the holder in a direction extending in the longitudinal direction of the shelf can be absorbed elastically in the bend.

17 Claims, 4 Drawing Sheets

(51) Int. Cl.
*A47B 57/06* (2006.01)
*A47B 57/20* (2006.01)
*A47B 96/06* (2006.01)
*F16F 1/44* (2006.01)
*A47B 47/00* (2006.01)
*A47B 31/00* (2006.01)

(52) U.S. Cl.
CPC ............... *A47B 96/06* (2013.01); *F16F 1/44* (2013.01); *A47B 47/0083* (2013.01); *A47B 2031/004* (2013.01)

(58) Field of Classification Search
USPC .............. 108/107, 108, 109, 147.16, 147.14, 108/147.21; 211/187, 182
See application file for complete search history.

(56) References Cited

U.S. PATENT DOCUMENTS

| | | | |
|---|---|---|---|
| 506,829 A | 10/1893 | Ohmer | |
| 722,760 A | 3/1903 | Scarborough | |
| 966,002 A | 8/1910 | Fricke | |
| 1,829,009 A * | 10/1931 | Madsen | A47B 57/485 108/109 |
| 1,976,810 A | 10/1934 | Skar et al. | |
| 2,528,807 A | 11/1950 | Whitney | |
| 2,549,879 A | 4/1951 | Amore | |
| 2,915,196 A * | 12/1959 | Pira | A47B 57/425 108/109 |
| 2,933,193 A * | 4/1960 | De Mattia | A47B 57/10 108/156 |
| 2,966,967 A * | 1/1961 | Levy | A47B 96/1416 108/107 |
| 3,007,708 A * | 11/1961 | Ochs | A47B 55/02 108/107 |
| 3,265,018 A | 8/1966 | Joyce | |
| 3,269,338 A | 8/1966 | Shewell | |
| 3,281,104 A | 10/1966 | Hamilton | |
| 3,295,695 A * | 1/1967 | Carmstrom | A47B 57/04 108/107 |
| 3,322,077 A * | 5/1967 | Kovacik | A47B 3/00 108/115 |
| 3,422,775 A | 1/1969 | Johnsson | |
| 3,435,958 A * | 4/1969 | Chesley | A47F 5/0031 108/107 |
| 3,785,301 A | 1/1974 | Lundqvist | |
| 3,797,903 A | 3/1974 | Traulsen | |
| 3,915,097 A * | 10/1975 | Young, Jr. | A47F 5/13 108/163 |
| 3,981,250 A | 9/1976 | Anthony | |
| 3,986,616 A | 10/1976 | Gray | |
| 4,067,530 A * | 1/1978 | Overman | A47B 96/14 108/107 |
| 4,233,912 A | 11/1980 | Ferdinand | |
| 4,345,525 A * | 8/1982 | de poorter | A47B 57/20 108/107 |
| 4,405,052 A | 9/1983 | Spiros | |
| 4,421,239 A | 12/1983 | Vargo | |
| 4,444,323 A | 4/1984 | Travis | |
| 4,457,239 A | 7/1984 | Heinze | |
| 4,469,031 A * | 9/1984 | Haycock | A47B 96/14 108/108 |
| 4,501,369 A | 2/1985 | Fox | |
| 4,582,001 A | 4/1986 | Leikarts | |
| 4,593,826 A | 6/1986 | Bustos | |
| 4,706,576 A * | 11/1987 | James | A47B 57/545 108/106 |
| 4,711,420 A | 12/1987 | Cowler et al. | |
| 4,735,325 A | 4/1988 | Remmers | |
| 4,742,782 A * | 5/1988 | Miller | A47B 47/024 108/107 |
| 4,815,394 A * | 3/1989 | Ettlinger | A47B 57/265 108/107 |
| 4,852,501 A | 8/1989 | Olson et al. | |
| 5,205,630 A | 4/1993 | Welch et al. | |
| 5,271,337 A | 12/1993 | Kolvites et al. | |
| 5,350,073 A | 9/1994 | Thornley et al. | |
| 5,372,415 A | 12/1994 | Tisbo et al. | |
| 5,797,502 A | 8/1998 | Brady et al. | |
| 5,797,503 A | 8/1998 | Stevens et al. | |
| 5,957,060 A | 9/1999 | Rosenband | |
| 6,053,115 A | 4/2000 | Felton | |
| 6,062,401 A | 5/2000 | Hall et al. | |
| 6,302,284 B1 | 10/2001 | Zonshin | |
| 6,311,856 B2 | 11/2001 | Battaglia et al. | |
| 6,526,897 B1 * | 3/2003 | Ondrasik | A47F 5/01 108/107 |
| 6,796,248 B1 | 9/2004 | Dressendorfer et al. | |
| 6,814,362 B2 * | 11/2004 | Hanson | B62B 3/006 108/107 |
| 7,113,762 B1 | 9/2006 | Hertz | |
| 7,478,971 B2 | 1/2009 | Li | |
| 7,533,948 B2 | 5/2009 | Smith et al. | |
| 7,669,945 B2 * | 3/2010 | Blersch | F25D 23/067 108/107 |
| 7,886,673 B2 | 2/2011 | Korte et al. | |
| D688,905 S | 9/2013 | Stravitz | |
| 8,616,388 B2 | 12/2013 | Butler | |
| 8,875,910 B2 | 11/2014 | Wurr et al. | |
| 2002/0043187 A1 | 4/2002 | Felton et al. | |
| 2003/0029362 A1 | 2/2003 | Ondrasik | |
| 2004/0000260 A1 | 1/2004 | Connor | |
| 2004/0222178 A1 | 11/2004 | Sparkowski | |
| 2005/0217543 A1 | 10/2005 | Hung | |
| 2008/0121600 A1 | 5/2008 | Korte et al. | |
| 2010/0252520 A1 | 10/2010 | Hsu | |
| 2011/0253656 A1 | 10/2011 | Vermeer | |
| 2016/0022034 A1 | 1/2016 | Hu | |
| 2016/0143438 A1 | 5/2016 | Jablow | |
| 2016/0166059 A1 | 6/2016 | Zohar et al. | |

FOREIGN PATENT DOCUMENTS

| | | |
|---|---|---|
| CN | 101715312 A | 5/2010 |
| CN | 202425968 U | 9/2012 |
| CN | 202445531 U | 9/2012 |
| CN | 202567034 U | 12/2012 |
| DE | 2737862 A1 | 3/1979 |
| DE | 3308314 A1 | 8/1983 |
| DE | 29922524 U1 | 5/2001 |
| DE | 20200500920 U1 | 9/2005 |
| DK | 139747 B | 4/1979 |
| EP | 0121745 B1 | 7/1987 |
| FR | 2087092 A6 | 12/1971 |
| GB | 1569405 A | 6/1980 |
| JP | H10165233 A | 6/1998 |
| WO | 9510208 A1 | 4/1995 |
| WO | 2004089159 A1 | 10/2004 |
| WO | 2005053459 A1 | 6/2005 |

OTHER PUBLICATIONS

International Search Report issued in corresponding application No. PCT/DK2014/050248, Dec. 15, 2014.
Written Opinion of the International Searching Authority issued in corresponding application No. PCT/DK2014/050248, Dec. 15, 2014.
Danish Search Report issued in related application No. PA 2013 70455, Apr. 4, 2014.
International Search Report issued in related application No. PCT/DK2014/050246, Dec. 8, 2014.
International Preliminary Report on Patentability issued in related application No. PCT/DK2014/050246, together with amended sheets of claims, Jul. 23, 2015.
Written Opinion of the International Searching Authority issued in corresponding application No. PCT/DK2014/050246, Dec. 8, 2014.
USPTO Non-Final Office Action issued in related U.S. Appl. No. 14/912,664, Oct. 7, 2016.
SIPO Search Report issued in related Chinese patent application No. 2014800463124, Nov. 12, 2016.

(56) References Cited

OTHER PUBLICATIONS

SIPO Office Action issued in related Chinese patent application No. 2014800463124, Nov. 21, 2016 (with English translation).
SIPO Examination Report issued in related Chinese patent application No. 201480046303.5, Feb. 4, 2017.

* cited by examiner

SHELF

CROSS-REFERENCE TO RELATED APPLICATIONS

This application is the U.S. National Stage Application of International Application No. PCT/DK2014/050248, filed on 20 Aug. 2014, and published on 26 Feb. 2015 as WO 2015/024572 A1, which claims the benefit of priority to Danish Patent Application Serial No. PA 2013/70456, filed on 21 Aug. 2013, the disclosure and teachings of which are incorporated herein by reference.

BACKGROUND

The present invention relates to a shelf for mounting on a substantially rectangular load carrier having four identical columns arranged in the corners thereof, said load carrier comprising columns having a rectangular profile with four side faces, on which shelf at least one holder is mounted that can be inserted into complementary slots in the columns of the load carrier and thereby engage in such a manner that the holder supports on the column.

Load carriers, such as carriages for handling goods, plants, products, etc., are widely used in the retail business, and often they are provided with a set of front wheels and a set of rear wheels mounted on the underside of a bottom frame having vertical columns that extend upwards from the corners of the bottom frame. One or more shelves are arranged for supporting the load charged to the carriage. The shelves are connected to each of the vertical columns by means of holders that can be configured as hooks and are arranged at the corners of the shelves. The holders are configured to engage with slots arranged at suitable intervals in the longitudinal direction of the columns, and the shelves can thereby be mounted or dismounted, moved and/or removed depending on the use situation. That the shelves are removable also means that load carriers take up less space during return transport in empty state.

The work with load carriers often takes place by means of manual operations since maybe the shelves are merely to be moved or else they are mounted manually on the columns of the load carrier. Such manual work entails an inherent risk that the shelves are lost or in other ways impacted by destructive forces.

It is particularly unfortunate when the shelves are lost in such a way that the face plane of the shelves are, during the fall, oriented vertically since that will often entail that the shelf lands on a holder facing downwards, and hereby there is a high risk of the holder absorbing largely all the energy of motion with ensuing deformation.

In practice the known construction entails that, at intervals, the shelves need to have one or more holders replaced.

This is, of course, inconvenient since, on the one hand, the shelves cannot be used during the time it takes to repair the shelf and, on the other, it requires cost-heavy repairs.

OBJECT AND BRIEF DESCRIPTION OF THE INVENTION

It is an object of the invention to provide a system whereby the above drawbacks are minimized.

That is accomplished by a system as set forth above which is characterised in that the holders are made from an elastic material with at least one shock-absorbing part which is provided with a bend extending in the transverse direction of the shelf, said shock-absorbing part being anchored in the shelf to the effect that forces applied to the holder in a direction extending in the longitudinal direction of the shelf can be absorbed elastically in the bend.

By configuring the holders in this way, it is accomplished that forces which, in the known constructions, entail deformations can now be absorbed elastically in that bend.

According to one embodiment the shelf comprises four holders where the holders are, in pairs of two, configured with a shock-absorbing part between them to the effect that the shock-absorbing part provided with bend extends from holders arranged on one side of the shelf to holders arranged on the other side of the shelf.

By such configuration of the holders it is accomplished that holders arranged on the one shorter side and on the other shorter side, respectively, can share at least one shock-absorbing element.

According to an embodiment, the holder is configured from a bar element bent such that it extends from one opening to another opening in the shorter side of the shelf and thereby spans out an opening between it and the shelf.

This opening is the one serving as "hook" when the shelf is to be mounted in the slots of the columns of the load carrier, and by configuring the holders as a "closed hook"/or opening, a high degree of strength is obtained.

According to one embodiment, the holders are each separately configured from a bar element that is bent such that it extends from one opening to another opening in the shorter side of the shelf and thereby spans out a rectangle between it and the shelf.

By configuring the holders such that they span out a rectangle, a high degree of strength is obtained while at the same time the rectangular configuration is easy to manufacture.

According to one embodiment, the holders are configured with a shock-absorbing part that extends between two holders that are constituted by a rod element spanning out an opening, which shock-absorbing part at the same time extends between the openings in the shorter side of the shelf that are closest to the longitudinally extending sides of the shelf.

As explained initially, it is often critical when the shelf is caused to hit on a corner. By providing precisely that part of the holder which is closest to the corner with a shock-absorbing part, a higher degree of safety against deformation of the holder is accomplished. It rarely occurs that two holders on the shorter side hit the underlay at the same time; rather it most often occurs in such a manner that a single holder hits first and thereby impacts the part of the rod which is connected to the shock-absorbing part.

According to one embodiment, the shock-absorbing part is deployed in a recess in the shelf.

Thereby it is accomplished that the shock-absorbing part sits more securely and also that the part of the shock-absorbing part that transmits forces to the shock absorber as such is secured against deflection, and thereby all of the energy is transferred from the holder to the shock absorber.

According to one embodiment, the shock-absorbing part is deployed in a recess in the shelf, and at the same time the shelf material is, in the area around the recess, mutually adapted to the shock-absorbing part to the effect that an impact on the shock-absorbing part is capable of deforming the shelf material in the area around the bend of the shock-absorbing part. By configuring the shelf in this way, very simple manufacture is accomplished since the shelf need not be configured with a recess allowing movement of the shock-absorbing part—as it is, that recess may be generated in use.

According to an embodiment, the shock-absorbing part is deployed in a recess in the shelf, wherein the shelf material is, in the area around the bend, removed in extension of the straight parts of the shock-absorbing part, thereby enabling elastic deformation thereof in the area around the bend.

According to one embodiment, the shelf is made of plastics.

BRIEF DESCRIPTION OF THE DRAWING

In the following, embodiments of the invention will be described with reference to the accompanying figures. It is to be stressed that the embodiments shown are exemplary, and that the invention is not limited thereto, wherein.

DETAILED DESCRIPTION

With starting point in the shown figures, an embodiment of the invention will be explained in further detail.

Figure 1:
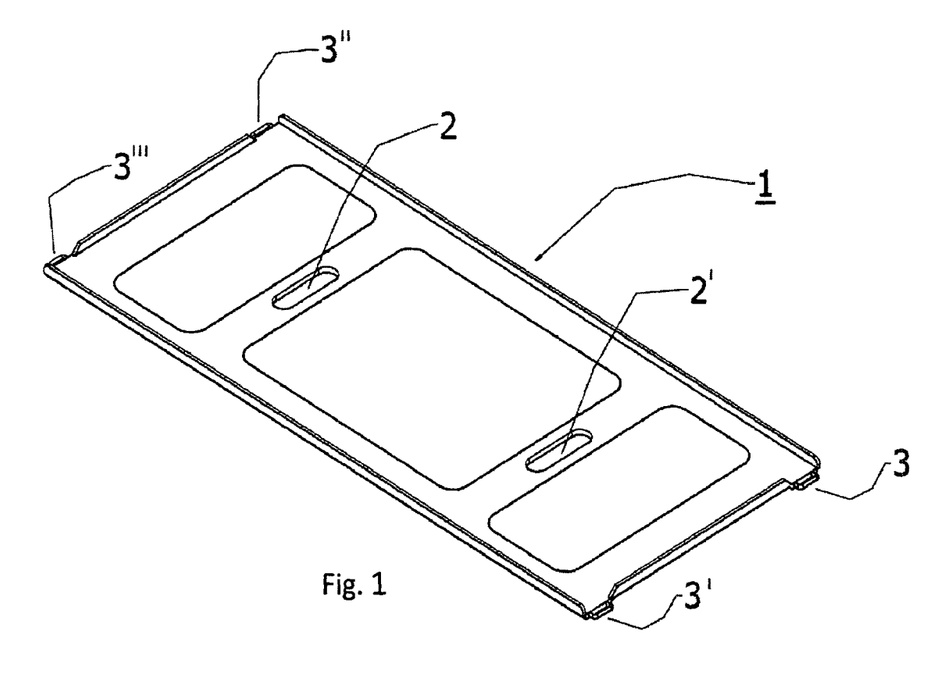
FIG. 1 is a side view of the top face of a shelf.

FIG. 1 shows a shelf 1 according to the invention. In the shown embodiment, the shelf is configured with recesses 2, 2' that can serve as handles.

The shelf is configured as a rectangle, and moreover it is configured with four identical holders 3, 3', 3", 3'" arranged on the shorter sides of the shelf. They are intended to engage with complementary slots in four columns (not shown).

Figure 2:
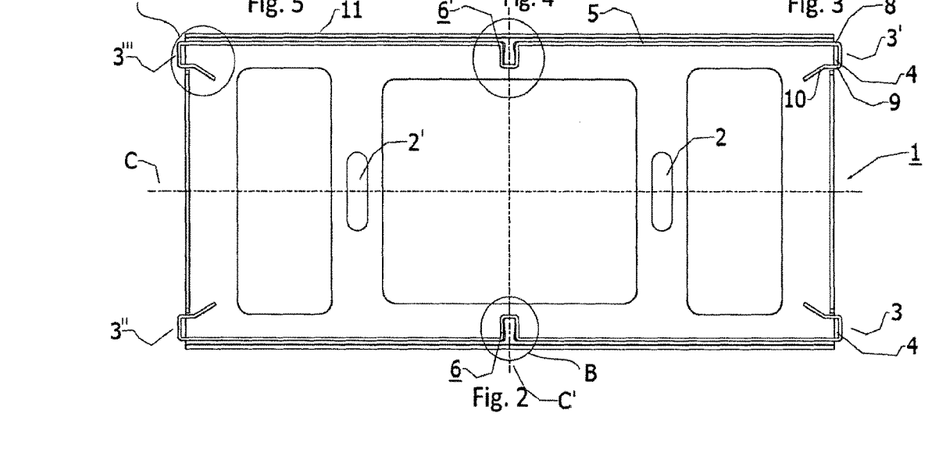
FIG. 2 shows the bottom face of a shelf.

In FIG. 2, the underside of the same shelf is shown, and there it will appear that, in the shown embodiment, the four holders are configured as a bent rod element that spans out a rectangle 4 between it and the shelf.

As will appear from the top of FIG. 2, the holder to the right-hand side 3' is, via a rod element 5, connected to the holder 3" to the left-hand side. As will also appear from FIG. 2, this rod element extends with a bend 6. That is shown in enlarged view in FIG. 4.

Figure 4:
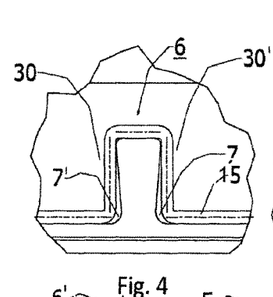
FIG. 4 shows an embodiment of a shock absorber shown in section B, FIG. 2, in enlarged view.
Figure 5:
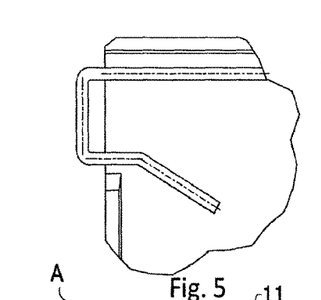
FIG. 5 shows an embodiment of a holder shown in section A, FIG. 2, in enlarged view.

Turning now to FIG. 4, the function of that bend will be explained in further detail. As will appear here, that bend is located in a recess 7, 7' that allows an axial and springy movement of the rod element 5, where the spring force comes from a momentum in the bend 6.

Such spring effect is of consequence to the longevity of shelves, since impact of a force on a holder is capable of transplanting axially through the rod 5 to the bend 6. By configuring rod and bend from a material that allows elastic deformation as explained in the paragraph above, it is thus possible to achieve that forces normally acting to deform a holder can be received elastically.

Thereby expensive repairs of a shelf can be prevented.

In the embodiment shown in FIG. 2, the shelf is not just configured such as to be symmetrical about the longitudinally extending symmetry line C thereof; rather it is also configured such that it is constructed symmetrically about the symmetry line C' extending in the shorter direction. Those symmetries are, for the sake of manufacture, advantageous, especially since the holders 3, 3' to the right-hand side of the shelf (seen in the figure) are thus caused to share the springy bends 6,6' (shown at the top and at the bottom of the figure) with the holders 3", 3'" to the left-hand side of the shelf. Albeit advantageous, that symmetrical construction is neither completely nor partially necessary for the invention.

From the same figure it will appear that the four holders 3, 3', 3", and 3'" can be configured alike, and, as will appear in the top right-hand corner of FIG. 2, the holders are, in the shown embodiment, configured with two parts that extend into a shorter side on the shelf, viz a part 8 that extends into the shelf at the longer side of the shelf. That part is a direct part of the shock-absorbing element of the shelf, it being an extension of the rod element 5.

The second part 9 of the holder extends into the shelf, closer to the longitudinally extending line of symmetry C of the shelf. That part 9 is, in the embodiment shown, configured with a bend and a part 10 in extension thereof which does not extend in parallel with the longer side of the shelf. The object of that bend and extension is to ensure good hold of the holder in the shelf.

The springy part (bend) 6 may, like in the shown embodiment, be configured such that it is connected to that part of the holder which extends into the shelf closest to that longer side 11. This is advantageous, it being thereby possible to obtain a higher degree of safety against deformation of the holder since, as explained above, a shelf that is lost will most often land on a corner, and precisely by connecting that part of the holder which is closest to the corner to the shock-absorbing part 15, it will be ensured that the most often occurring impacts can be absorbed in the shock-absorbing part.

However, one could also configure the shelf with a shock-absorbing part which is connected to that part of a holder which extends into the shelf farthest away from the longer side 11 thereof, and, of course, one could also imagine an embodiment in which the shelf is configured with one or more holders as shown in the figures, where both parts of the one or more holder(s) are configured with a connection for a shock-absorbing part.

Figure 3:
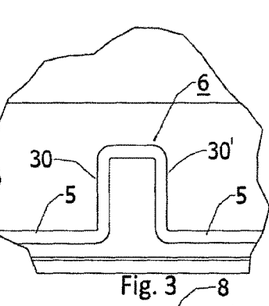
FIG. 3 shows an embodiment of a shock absorber shown in section B, FIG. 2, in enlarged view.

FIG. 3 shows a bend 6 that does not extend in a recess/recessing 7 as shown in FIG. 4. That embodiment of the invention lends itself for use in particular in case of shelves where the shelf material as such is of such nature that the recess/recessing is created by an impact on the rod 5 which may arise during normal use, viz. when, when falling, the shelf lands on a holder. By configuring shelf holder and shock absorber in this way, very simple manufacture is obtained.

Figure 6:
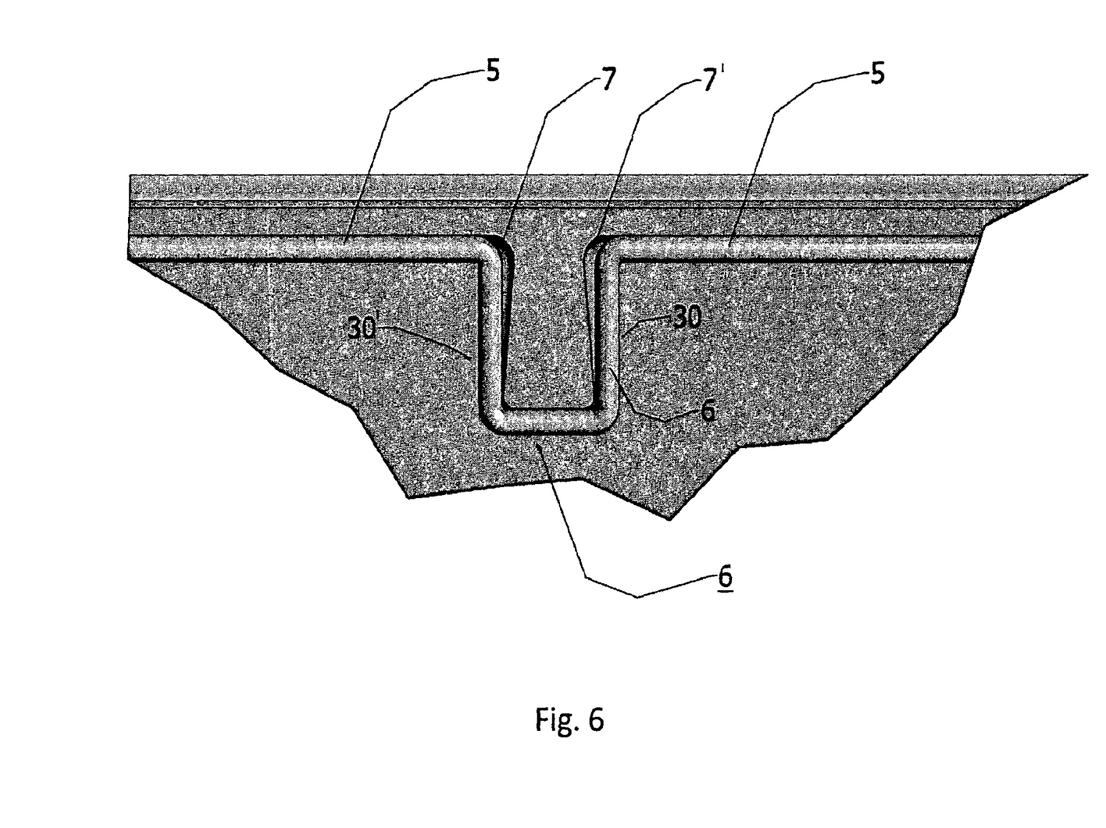
FIG. 6 shows a section of a shelf, where the shock-absorbing part is deployed in a recess in the shelf.

FIG. 6 shows, in enlarged view, how a shelf can be configured with a rod part 5 that connects a holder (not shown) to a shock-absorbing part that extends in a bend 6 which is deployed in a recess 7, 7'. That recess allows that the upper parts (in the figure) of the bend can be moved freely during elastic deformation.

In FIG. 6 it is also shown how rod element 5 with bend 6 can be retained in a recess configured in a shelf of plastics. Here, rod element 5 and bend 6 extend in entirety in a recess in the shelf. By configuring the shelf in that way, it is possible to obtain advantageous securing of the rod element and bend, as they can be retained merely by melting a portion of plastics material on both sides of the rod element (also where it extends in the bend 6). Thereby deflection of the rod material is prevented (at right angles to the face plane of the shelf), since all pressure forces are conveyed to the bend 6.

Figure 7:
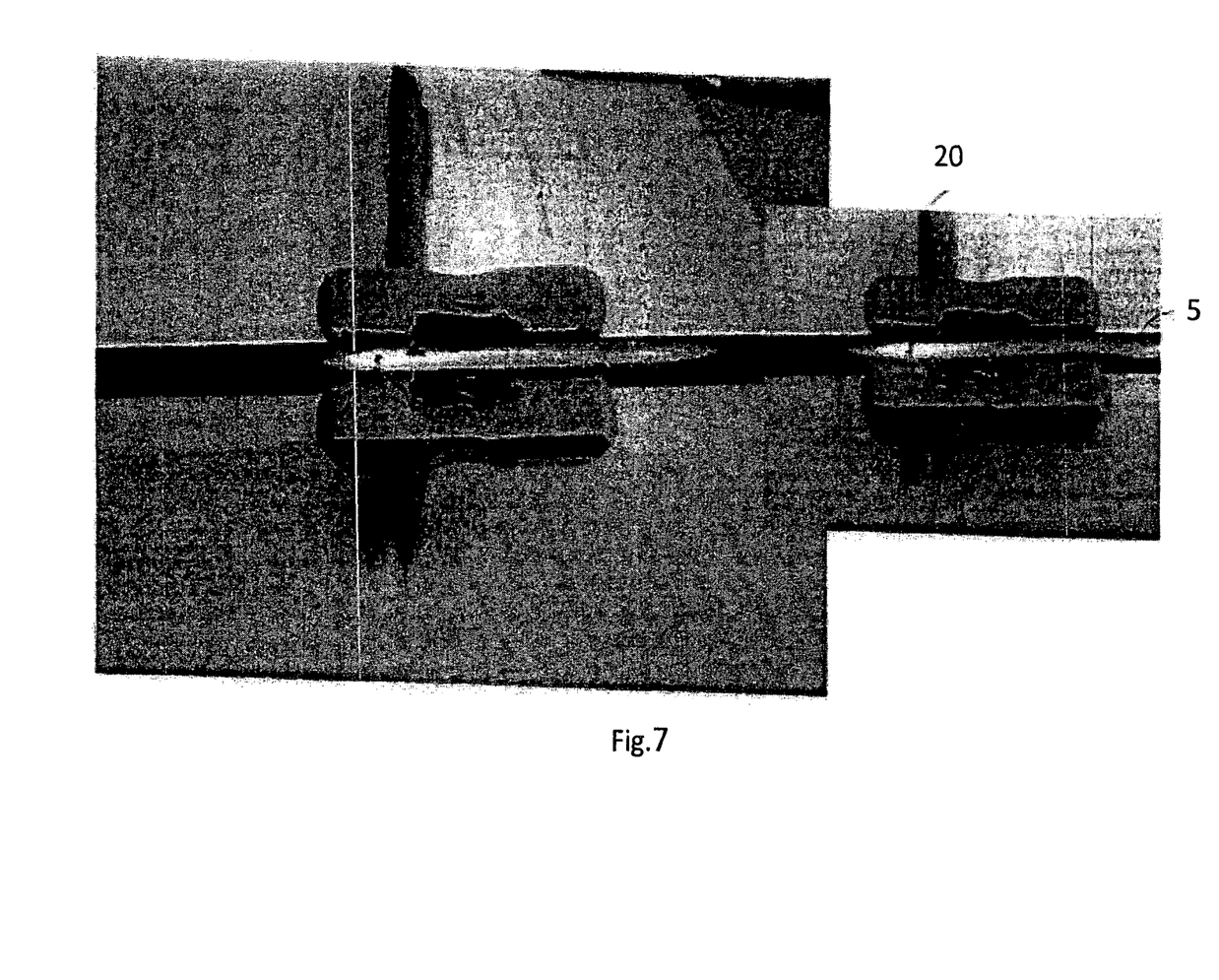
FIG. 7 shows how a shock-absorbing part can be retained in a shelf.

The melting as such may be configured as shown by reference numeral 20 in FIG. 7. Preferably, the melting takes place in one or more places at the rod element 5 and such that the rod element can be caused to travel axially in the "tunnel" obtained by the melting.

By securing rod element with bend as explained above, improved options for maintenance are obtained, since, if holder with rod element and bend are to be replaced, it may occur by the following actions: rupturing the melted places; removing rod element and bend, inserting a new rod with bend; melting material to both sides of the rod at the straight parts thereof and/or melting of material around the rod in its bend.

According to an embodiment of the method described above, the rupturing of the melted places takes place by one forcing—during removal—rod element with bend through them.

Preferably the melting around a new rod occurs in places that have not previously been melted.

The above method for performing maintenance may, of course, take place in case of any rod element that is arranged in a recess in a shelf and retained by means of melting. Therefore, the method may be subject to an independent application.

In the shown exemplary embodiments, the shock-absorbing part of the shelf are constructed as a rod that comprises a bend that preferably extends in plane-parallel with the face plane of the shelf; but, of course, the shock-absorbing part may also be constructed in ways where the bend does not necessarily extend in that way, including with a bend that extends like a helical spring.

Moreover, the shock absorber is shown in the figures as if it sits between two holders that span out an area. The invention need not necessarily be configured like that, since the shock-absorbing part may just as well be mounted to only one holder, and, likewise, there may also be mounted a shock-absorbing part to each individual holder. Or in other words: each individual holder may be configured with its own shock-absorbing part that functions independently of the other holders, and the holders may also be configured as hooks, and the latter applies whether or not the shock absorber sits between two holders.

The construction with a bend, however, also presents advantages as to strength as explained in the following with reference to FIG. 6 in particular, from where it will appear that the two legs of the bend each has its abutment face 30 and 30' against the shelf material.

As it is, the construction with the bend and those abutment faces serves two purposes that both contribute to the longevity of the shelf; the one purpose of the bend being, as explained above, to prevent damage to the holders if the shelf is eg dropped.

The second purpose is obtained by means of holders connected to rod material with a bend 6 having abutments 30 and 30' against the material of the shelf, like the legs on the bend 6. This is due to the fact that, when the shelf is mounted in the columns and a load is applied to the shelf, a pull will occur in the rod material 5 from the holders 3 to the bend 6, and that pull will transplant and become absorbed in the abutment faces of the legs against the material of the shelf. That configuration is thus a strength-enhancing measure, the rod material 5 with bend 6 reinforcing the shelf to the effect that, while loaded, deflections can be reduced.

What is claimed is:

1. A shelf for mounting on a substantially rectangular load carrier having four identical columns arranged in the corners thereof, the columns each having a rectangular profile with four side faces and complementary slots therein each comprising downwardly-extending cut-outs, the shelf comprising:
    at least one holder secured to said shelf, the at least one holder comprising two parallel legs and a middle part, extending outwardly in a longitudinal direction from an end of the shelf, and creating an opening between the holder and the shelf, the at least one holder adapted to be inserted into the complementary slots in the columns of the load carrier and thereby engage in such a manner that the at least one holder is supported by the column when the parallel legs and middle part of the holder are passed through the slots and engage the downwardly-extending cut-outs of each slot;
    wherein the holder is connected to a shock-absorbing part which is provided with a bend extending in a transverse direction of the shelf, said shock-absorbing part being anchored in the shelf to the effect that forces applied to the holder in a direction extending in the longitudinal direction of the shelf can be absorbed elastically in the bend by the shock-absorbing part.

2. A shelf according to claim 1, wherein the holder is configured from a rod element which is bent such that it extends from one opening to another opening in the shorter side of the shelf.

3. A shelf according to claim 2, wherein the shelf comprises four holders, where the holders are, in pairs of two, configured with a shock-absorbing part between them to the effect that the shock-absorbing part provided with bend extends from holders arranged on one side of the shelf to holders arranged on the other side of the shelf.

4. A shelf according to claim 2, wherein the shelf comprises a holder with a shock-absorbing part that is arranged in a recess in the shelf.

5. A shelf according to claim 1, wherein the opening is a rectangle.

6. A shelf according to claim 5, wherein the shelf comprises four holders, where the holders are, in pairs of two, configured with a shock-absorbing part between them to the effect that the shock-absorbing part provided with bend extends from holders arranged on one side of the shelf to holders arranged on the other side of the shelf.

7. A shelf according to claim 5, wherein the shelf comprises a holder with a shock-absorbing part that is arranged in a recess in the shelf.

8. A shelf according to claim 1, wherein the shock-absorbing part is connected to the at least one holder.

9. A shelf according to claim 8, wherein the holders are configured with a shock-absorbing part extending between two holders that are constituted of a rod element spanning from one opening to another opening arranged on the other side of the shelf along a longitudinally extending side of the shelf.

10. A shelf according to claim 9, wherein the shock-absorbing part is deployed in a recess in the shelf, and wherein the shelf is, in an area around the recess, mutually adapted to the shock-absorbing part to the effect that an impact on the shock-absorbing part can deform the shelf in the area around the bend of the shock-absorbing part.

11. A shelf according to claim 9, wherein the shock-absorbing part is deployed in a recess in the shelf such that straight parts of the shock-absorbing part enables elastic deformation of the shelf in the area around the bend.

12. A shelf according to claim 8, wherein the shelf comprises a holder with a shock-absorbing part that is arranged in a recess in the shelf.

13. A shelf according to claim 1, wherein the shelf comprises four holders, where the holders are, in pairs of two, configured with a shock-absorbing part between them to the effect that the shock-absorbing part provided with bend extends from holders arranged on one side of the shelf to holders arranged on the other side of the shelf.

14. A shelf according to claim 13, wherein the shelf comprises a holder with a shock-absorbing part that is arranged in a recess in the shelf.

15. A shelf according to claim 1, wherein the shelf comprises a holder with a shock-absorbing part that is arranged in a recess in the shelf.

16. A shelf according to claim 15, wherein the shock-absorbing part is deployed in a recess in the shelf, where the shelf is, in an area around the bend, removed in extension of straight parts of the shock-absorbing part and hence enables elastic deformation thereof in the area around the bend.

17. A shelf according to claim 1, wherein the shelf is made of plastics.

* * * * *